(12) United States Patent
Nariai et al.

(10) Patent No.: US 12,194,621 B2
(45) Date of Patent: Jan. 14, 2025

(54) INSULATING UNIT AND ROBOT (71) Applicant: Kawasaki Jukogyo Kabushiki Kaisha, Kobe (JP)

(72) Inventors: Hitoshi Nariai, Kobe (JP); Akinori Tani, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 197 days.

(21) Appl. No.: 17/917,249

(22) PCT Filed: Mar. 29, 2021

(86) PCT No.: PCT/JP2021/013319
§ 371 (c)(1),
(2) Date: Oct. 6, 2022

(87) PCT Pub. No.: WO2021/205929
PCT Pub. Date: Oct. 14, 2021

(65) Prior Publication Data
US 2023/0150149 A1 May 18, 2023

(30) Foreign Application Priority Data
Apr. 6, 2020 (JP) ................. 2020-068429

(51) Int. Cl.
*B25J 19/00* (2006.01)
(52) U.S. Cl.
CPC ..................... *B25J 19/00* (2013.01)
(58) Field of Classification Search
CPC ....................................... B25J 19/00

USPC ........................................... 174/139
See application file for complete search history.

(56) References Cited

U.S. PATENT DOCUMENTS

2016/0031078 A1* 2/2016 Kapoor ............... B25J 9/0081
700/258

FOREIGN PATENT DOCUMENTS

| JP | 62-142083 | A | | 6/1987 |
| JP | S62-142083 | | * | 6/1987 |
| JP | 11-114873 | A | | 4/1999 |
| JP | 2004-148467 | A | | 5/2004 |
| JP | 2019-209435 | A | | 12/2019 |

* cited by examiner

*Primary Examiner* — Stanley Tso
(74) *Attorney, Agent, or Firm* — XSENSUS LLP (57) ABSTRACT

An insulating structure disposed so as to intervene between a first member of a robotic arm and an end effector includes a second member fixed to the first member, the end effector being attachable to the second member, and an insulator that insulates the second member from the first member. The second member includes a second hole into which a first bolt that fixes the second member to the first member is inserted, and a third hole into which a second bolt that fixes the end effector to the second member is inserted. The second hole and the third hole are disposed so that, in a state where the second member is fixed to the first member, the position of the third hole matches with the position of a first hole for attachment of the end effector, the first hole being formed beforehand in the first member.

12 Claims, 7 Drawing Sheets

INSULATING UNIT AND ROBOT

CROSS-REFERENCE TO RELATED APPLICATIONS

This application is based on PCT filing PCT/JP2021/013319, filed on Mar. 29, 2021, and claims the benefit of priority to Japanese Patent Application No. 2020-068429 filed on Apr. 6, 2020 with the Japan Patent Office, each of which is incorporated as a part of this application by reference in its entirety.

TECHNICAL FIELD

The present disclosure relates to an insulating unit and a robot.

BACKGROUND ART

Conventionally, among end effectors attached to a robotic arm, there is an end effector for performing a welding operation. Since such an end effector is a high-voltage electric apparatus, an electrical insulation is necessary between the end effector and the robotic arm. For example, Patent Document 1 discloses an industrial robot provided with an electric insulating member between a final reduction gear at a tip-end part of a robot body part and a wrist flange. The wrist flange provides a mechanical interface, and is configured so that the electric apparatus (end effector) is attached thereto.

REFERENCE DOCUMENT(S) OF CONVENTIONAL ART

Patent Document

[Patent Document 1] JP1999-114873A

DESCRIPTION OF THE DISCLOSURE

For example, in Patent Document 1, when attaching the insulating member to the existing robot body, removal and installation of the wrist flange are necessary. That is, a change in the structure of the robot body is necessary, and therefore, the installation of the insulating member takes time and effort.

One purpose of the present disclosure is to provide an insulating unit and a robot capable of simplifying installation of an insulating member to a robotic arm.

In order to achieve the above purpose, an insulating unit according to one aspect of the present disclosure is an insulating unit disposed so as to intervene between a tip-end member of a robotic arm and an end effector attached to the tip-end member, which includes an intermediate member fixed to the tip-end member, the end effector being attachable to the intermediate member, and an insulating member that is disposed between the intermediate member and the tip-end member, and insulates the intermediate member from the tip-end member. The intermediate member includes at least one first mounting hole into which a first bolt that fixes the intermediate member to the tip-end member is inserted, and at least one second mounting hole into which a second bolt that fixes the end effector to the intermediate member is inserted. The first mounting hole and the second mounting hole are disposed so that, in a state where the intermediate member is fixed to the tip-end member, the positions of the second mounting holes match with the positions of tip-end mounting holes for attachment of the end effector respectively, the tip-end mounting holes being formed beforehand in the tip-end member.

MODES FOR CARRYING OUT THE DISCLOSURE

Hereinafter, embodiments of the present disclosure will be described with reference to the drawings. Note that each embodiment which will be described below is to illustrate a comprehensive or concrete example. Further, among components in the following embodiments, components which are not described in the independent claims which indicate the top concept are described as arbitrary components. Moreover, each figure in the accompanying drawings is a schematic figure, and it is not necessarily illustrated exactly. Further, in each figure, the same reference characters are assigned to substantially the same components, and therefore, the redundant explanation may be omitted or simplified.

Embodiment 1

Figure 1:
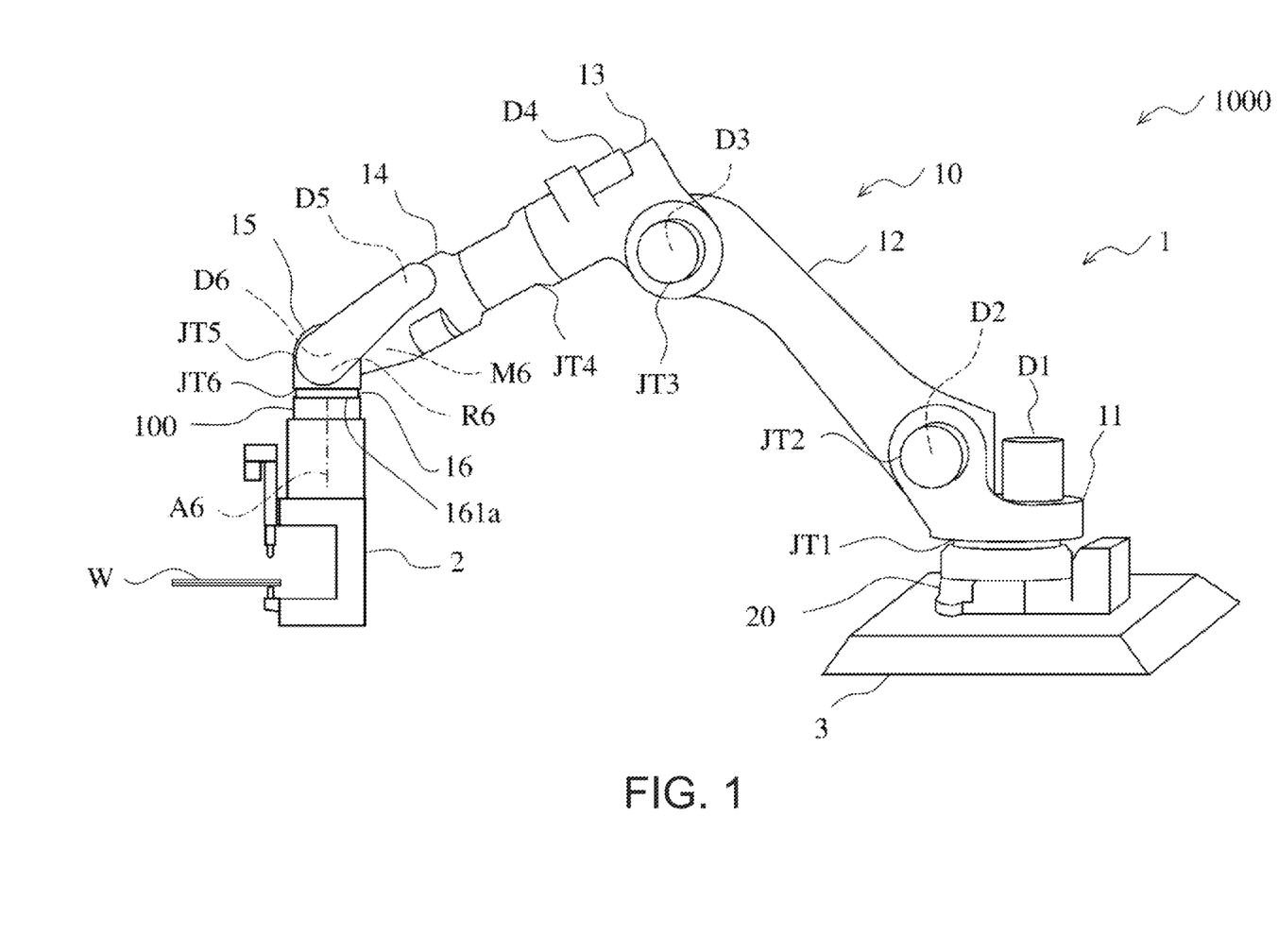
FIG. 1 is a side view illustrating one example of a configuration of a robot according to Embodiment 1.

A configuration of a robot 1000 according to Embodiment 1 is described. FIG. 1 is a side view illustrating one example of the configuration of the robot 1000 according to Embodiment 1. As illustrated in FIG. 1, the robot 1000 includes a robotic arm 1, an end effector 2, and an insulating unit 100. The robotic arm 1 is fixedly disposed on an upper surface of an installation part 3 formed on a support surface, such as a floor surface etc. Although in this embodiment the installation part 3 is a table which is formed on the floor surface and has a horizontal upper surface, it is not limited to this configuration, and, for example, it may be a part of the floor surface. Note that the installed location of the robotic arm 1 is not limited to the floor surface, but it may be any kind of place (e.g., a stand such as a shelf, a wall, or a ceiling).

The end effector 2 is a component which applies an action to a processing object of the robot 1000, and it is attached to a tip end of the robotic arm 1. Although not limited to this configuration, the end effector 2 is an electric apparatus to which voltage is applied, and in this embodiment, it is a spot welding gun which is one example of an electric apparatus which handles high voltage. The robot 1000 performs a spot welding work on a workpiece W by using the end effector 2. The end effector 2 is attached to the tip end of the robotic arm 1 via the insulating unit 100. The insulating unit 100 is attached to the tip end of the robotic arm 1, and the end effector 2 is attached to the insulating unit 100. The insulating unit 100 electrically insulates the end effector 2 from the robotic arm 1.

A configuration of the robotic arm 1 is described. As illustrated in FIG. 1, the robotic arm 1 is a component which freely moves the end effector 2, and includes an arm body 10 and a base part 20. The base part 20 supports the arm body 10 so as to be stewed, and is fixed to the upper surface of the installation part 3.

The arm body 10 includes links 11-16 which are serially disposed from the base part 20 toward the tip end of the arm body 10, joints JT1-JT6 which sequentially connect the links 11-16 so as to be rotatable, and arm drives D1-D6 which rotate the respective joints JT1-JT6. The joints JT1-JT6 are rotary joints.

The link 11 is connected with the base part 20 via the joint JT1. A flange surface 161a which is an end face of the link 16 constitutes a mechanical interface for connecting it with the end effector 2. In this embodiment, the flange surface 161a is connected to the insulating unit 100, and therefore, it is indirectly connected with the end effector 2 via the insulating unit 100. The arm drives D1-D6 use electric power as their power sources. The arm drives D1-D6 each include an electric motor which is a driving source, and a reduction gear which transmits a rotational driving force of the electric motor while decreasing a rotational speed of the electric motor and increasing the rotational driving force of the electric motor. For example, the electric motor may be a servomotor. For example, the arm drive D6 includes an electric motor M6 and a reduction gear R6. Note that the number of joints of the arm body 10 is not limited to six, but it may be seven or more, or five or less. The arm drive D6, the electric motor M6, and the reduction gear R6 are examples of a drive.

For example, the joint JT1 couples a base-end part of the link 11 to the base part 20 so as to be rotatable on a vertical rotation axis perpendicular to the upper surface of the installation part 3. The joint JT2 couples a base-end part of the link 12 to a tip-end part of the link 11 so as to be rotatable on a horizontal rotation axis along the upper surface of the installation part 3. The joint JT3 couples a base-end part of the link 13 to a tip-end part of the link 12 so as to be rotatable on a horizontal rotation axis. The joint JT4 couples a base-end part of the link 14 to a tip-end part of the link 13 so as to be rotatable on a rotation axis of the axial center in the longitudinal direction of the link 13. The joint JT5 couples a base-end part of the link 15 to a tip-end part of the link 14 so as to be rotatable on a rotation axis in a direction perpendicular to the rotation axis of the link 14. The joint JT6 couples a base-end part of the link 16 to a tip-end part of the link 15 so as to be rotatable on a twist rotation axis A6.

The arm body 10 described above can freely move the position of the link. 16 to an arbitrary three-dimensional position and can freely move the posture of the link 16 to an arbitrary three-dimensional posture, within a range where the arm body 10 can operate.

Figure 2:
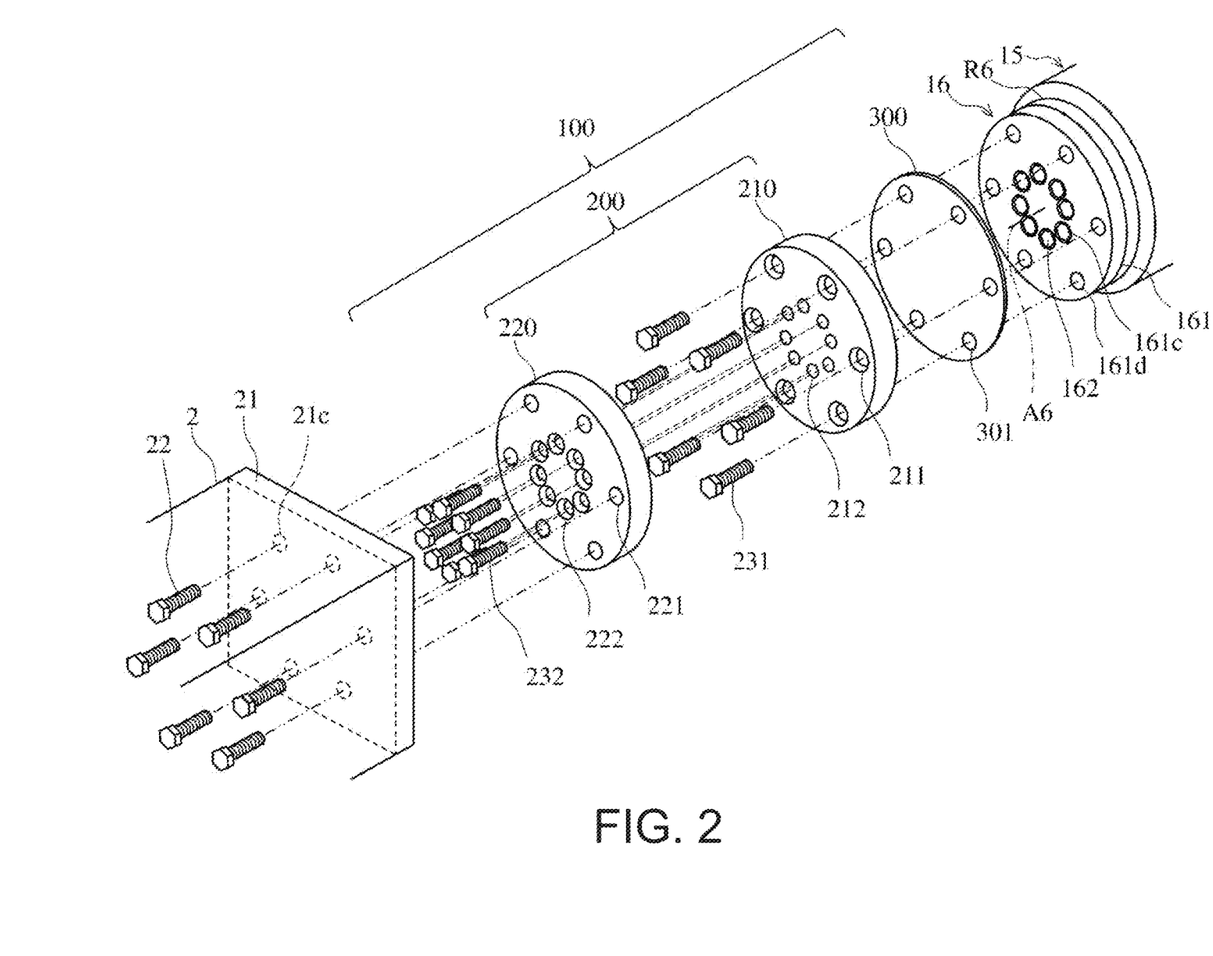
FIG. 2 is an exploded perspective view illustrating one example of a configuration of an insulating unit according to Embodiment 1.
Figure 3:
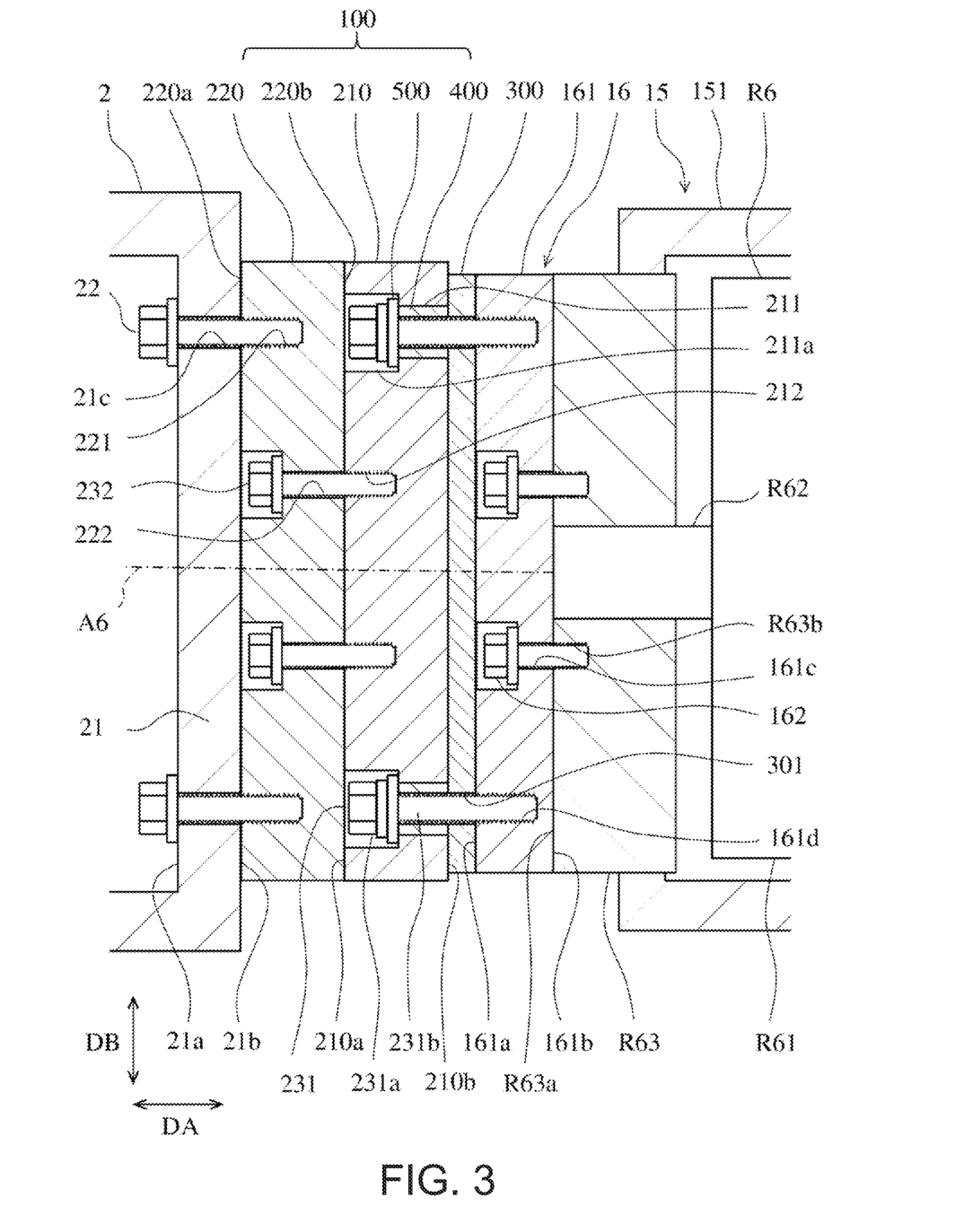
FIG. 3 is a cross-sectional side view illustrating one example of the configuration of the insulating unit according to Embodiment 1.

A configuration of the insulating unit 100 and the peripheries of the insulating unit 100 is described. FIG. 2 is an exploded perspective view illustrating one example of the configuration of the insulating unit 100 according to Embodiment 1. FIG. 3 is a cross-sectional side view illustrating one example of the configuration of the insulating unit 100 according to Embodiment 1. FIG. 3 illustrates a cross section including the twist rotation axis A6. As illustrated in FIGS. 2 and 3, the link 16 includes a tip-end member 161, and a bolt 162 for fixing the tip-end member 161.

The tip-end member 161 is a member which constitutes the mechanical interface with the end effector 2, and is connected to the reduction gear R6 disposed inside a cover 151 of the link 15.

The reduction gear R6 includes a main body R61 which includes a reduction gear mechanism therein, an output shaft R62 of the main body R61, and an end flange R63 connected to the output shaft R62. The main body R61 is connected to a rotation driving shaft of the electric motor M6 (see FIG. 1), and transmits the rotational driving force transmitted from the electric motor M6 to the output shaft R62 in a state where a rotational speed is lowered and the driving force is raised. The output shaft R62 rotates on the rotation axis A6 by the rotational driving force.

The end flange R63 is connected to an end of the output shaft R62 so that it integrally rotates with the output shaft R62. The end flange R63 rotates along the circumferential direction of a circumferential edge of the end flange R63 centering on the rotation axis A6. One principal surface R63a of two principal surfaces of the end flange R63 exposes outside from the cover 151, and a plurality of flange fixing holes R63b are formed in the principal surface R63a. In this embodiment, although each flange fixing hole R63b is an internally threaded hole which is threadedly engageable with the bolt 162, it is not limited to this configuration, but it may be any kind of holes, such as a simple hole, a hole with a key, or a hole with a key groove.

The tip-end member 161 is a plate-like member, and, for example, it is a circular flange. A plurality of member fixing holes 161c and a plurality of tip-end mounting holes 161d are formed in the tip-end member 161. The plurality of member fixing holes 161c are holes for fixing the tip-end member 161 to the end flange R63 by using the bolts 162. That is, the plurality of member fixing holes 161c are holes for fixing the tip-end member 161 to the arm body 10. In this embodiment, the number of member fixing holes 161c is eight. Each member fixing hole 161c is a hole which penetrates the tip-end member 161 between the two principal surfaces 161a and 161b of the tip-end member 161. The principal surface 161a is a flange surface of the link 16. Below, both the expressions of "the principal surface 161a" and the flange surface 161a" will be used suitably.

Each member fixing hole 161c includes a counter sinking part in the principal surface 161a, and its diameter is partially increased near the principal surface 161a. The plurality of member fixing holes 161c are disposed so that the positions of the plurality of member fixing holes 161c match with the positions of the plurality of flange fixing holes R63b.

The tip-end member 161 is disposed so that the principal surface 161b is adjacent to the principal surface R63a of the end flange R63. Further, the bolt 162 is inserted into the member fixing hole 161c and the flange fixing hole R63b in this order, and is thrusted into the flange fixing hole R63b. Therefore, the tip-end member 161 is fixed to the end flange R63, and can rotate on the rotation axis A6, together with the end flange R63. The rotation axis A6 is one example of a rotation axis of the robotic arm 1. The counter sinking part of each member fixing hole 161c accommodates the head of the bolt 162 so that the head does not project from the principal surface 161a.

The plurality of the tip-end mounting holes 161d are holes for fixing the end effector 2 to the tip-end member 161. The plurality of the tip-end mounting holes 161d may be formed in the tip-end member 161 by the time the robotic arm 1 is shipped, for example, during manufacturing the robotic arm 1, That is, the plurality of tip-end mounting holes 161d are holes for attaching the end effector 2 which are formed beforehand in the tip-end member 161. In this embodiment, the number of tip-end mounting holes 161d is six. Each tip-end mounting hole 161d is formed in the principal surface 161a at a position different from the eight member fixing holes 161c (in detail, at a position radially outward of the rotation axis A6 with respect to the eight member fixing holes 161c). Although each tip-end mounting hole 161d extends toward the principal surface 161b from the principal surface 161a, it does not reach the principal surface 161b. Each tip-end mounting hole 161d is an internally threaded hole which is threadedly engageable with a bolt 22 for fixing the end effector 2 and does not penetrate the tip-end member 161. Note that the tip-end mounting holes 161d may penetrate the tip-end member 161.

The end effector 2 includes a fitting part 21 configured to be attached to the tip-end member 161. The fitting part 21 is a plate-like member, and, for example, it is a flange. A plurality of tool mounting holes 21c are formed in the fitting part 21. In this embodiment, the number of tool mounting holes 21c is the same as the number of tip-end mounting holes 161d, which is six. Each tool mounting hole 21c penetrates the fitting part 21 between two principal surfaces 21a and 21b of the fitting part 21. The six tool mounting holes 21c are disposed so that the positions of the six tool mounting holes 21c match with the positions of the six tip-end mounting holes 161d.

For example, the end effector 2 is disposed at the tip-end member 161 in a state where the principal surface 21b of the fitting part 21 is adjacent to the principal surface 161a of the tip-end member 161, and the tool mounting holes 21c are aligned with the tip-end mounting holes 161d in the direction of the rotation axis A6, respectively. The bolt 22 is inserted into the tool mounting hole 21c and the tip-end mounting hole 161d in this order, and is thrusted into the tip-end mounting hole 161d. Therefore, the fitting part 21 may be fixed to the tip-end member 161.

The tip-end member 161 as described above is a structural member of the arm body 10, and is a reinforcement member having the strength to support the end effector 2. Further, the tip-end member 161 is a rotatable action member. Such a tip-end member 161 is made of metal, such as iron, having conductivity.

The insulating unit 100 includes an intermediate member 200 and a first insulating member 300. The intermediate member 200 is fixed to the tip-end member 161, and is configured to be attachable to the end effector 2. The first insulating member 300 is disposed between the intermediate member 200 and the tip-end member 161, and is configured to insulate the intermediate member 200 from the tip-end member 161.

In this embodiment, the intermediate member 200 includes a first intermediate member 210 and a second intermediate member 220. Each of the intermediate members 210 and 220 is a plate-like member, and in this embodiment, it is a disk.

The first insulating member 300 is made of material with electrical insulation. In this embodiment, the first insulating member 300 is a plate-like member made of bakelite, and, in detail, is a disk thinner than the intermediate members 210 and 220. For example, the first insulating member 300 is cloth bakelite or paper bakelite. Note that the material which forms the first insulating member 300 is not limited to bakelite, but it may be any kind of material with electrical insulation. Also the configuration of the first insulating member 300 is not limited to the plate-like configuration, and it may be any configuration as long as it can realize electrical insulation between members on both sides of the first insulating member 300. For example, the first insulating member 300 may be a film-like member.

At least one insertion hole 301 is formed in the first insulating member 300. In this embodiment, the number of insertion holes 301 is two or more, and, in detail, it is the same as the number of tip-end mounting holes 161d, which is six. The six insertion holes 301 are disposed so that the positions of the six insertion holes 301 match with the positions of the respective six tip-end mounting holes 161d.

The first insulating member 300, the first intermediate member 210, and the second intermediate member 220 are disposed in this order in a direction separating from the tip-end member 161 along the rotation axis A6.

At least one first mounting hole 211 and at least one third mounting hole 212 are formed in the first intermediate member 210. In this embodiment, the number of first mounting holes 211 and the number of third mounting holes 212 are two or more. In detail, the number of first mounting holes 211 is the same as the number of tip-end mounting holes 161d, which is six, and the number of third mounting holes 212 is eight. Each first mounting hole 211 is a hole for fixing the first intermediate member 210 to the tip-end member 161 by using a bolt 231. The configuration, such as the nominal diameter and the screw pitch, of the bolt 231 is the same as the bolt 22. Each third mounting hole 212 is a hole for fixing the second intermediate member 220 to the first intermediate member 210 by using a bolt 232. The bolt 231 is one example of a first bolt, and the bolt 232 is one example of a third bolt.

Each first mounting hole 211 penetrates the first intermediate member 210 between two principal surfaces 210a and 210b of the first intermediate member 210. Each first mounting hole 211 includes, in the principal surface 210a, a counter sinking part 211a which can accommodate a head 231a of the bolt 231, and its diameter is partially increased near the principal surface 210a. The six first mounting holes 211 are disposed so that the positions of the six first mounting holes 211 match with the positions of the six tip-end mounting holes 161d.

The eight third mounting holes 212 are formed in the principal surface 210a at positions different from the six first mounting holes 211. In this embodiment, the eight third mounting holes 212 are disposed at positions radially inward of the rotation axis A6 with respect to the six first mounting holes 211. Although each third mounting hole 212 extends toward the principal surface 210b from the principal surface 210a, it does not reach the principal surface 210b. Each third mounting hole 212 is threadedly engageable with the bolt 232, and is an internally threaded hole which does not penetrate the first intermediate member 210. Note that the third mounting hole 212 may penetrate the first intermediate member 210.

Here, the insulating unit 100 has, in each first mounting hole 211, a cylindrical second insulating member 400 which matches with an inner circumferential surface of the first mounting hole 211. The second insulating member 400 permits insertion of a shank 231b of the bolt 231. The second insulating member 400 is disposed at a part of the first mounting hole 211 other than the counter sinking part 211a. Further, the insulating unit 100 has, inside the counter sinking part 211a of each first mounting hole 211, a third insulating member 500, having an annular plate shape which is the shape of a washer, corresponding to the bolt 231. The third insulating member 500 permits insertion of the shank 231b of the bolt 231, but does not permit insertion of the head 231a of the bolt 231. Although the second insulating member 400 and the third insulating member 500 are made of material having electrical insulation, and, for example, they may be made of Bakelite similar to the first insulating member 300, they are not limited to this configuration.

The first intermediate member 210 is disposed at the tip-end member 161 in a state where the principal surface 210b is adjacent to the principal surface 161a of the tip-end member 161, and the first mounting holes 211 are aligned with the tip-end mounting holes 161d in the direction of the rotation axis A6. At this time, the first insulating member 300 is disposed between the first intermediate member 210 and the tip-end member 161 in a state where the insertion holes 301 are aligned with the tip-end mounting holes 161d in the direction of the rotation axis A6. The third insulating member 500 is disposed inside the counter sinking part 211a of the first mounting hole 211 so that the third insulating member 500, the second insulating member 400 of the first mounting hole 211, the insertion hole 301, and the tip-end mounting hole 161d are lined up in a single file. The shank 231b of the bolt 231 is inserted into the third insulating member 500, the second insulating member 400, the insertion hole 301, and the tip-end mounting hole 161d in this order, and is thrusted into the tip-end mounting hole 161d.

Therefore, the first intermediate member 210 is fixed to the tip-end member 161 in a state where the first insulating member 300 is sandwiched between the first intermediate member 210 and the tip-end member 161. The third insulating member 500 intervenes between the head 231a of the bolt 231 and an inner surface of the counter sinking part 211a to insulate the head 231a from the first intermediate member 210. The second insulating member 400 intervenes between the shank 231b of the bolt 231 and the inner circumferential surface of the first mounting hole 211 to insulate the shank 231b from the first intermediate member 210. The insulating members 400 and 500 insulate the bolt 231 from the first intermediate member 210. The first insulating member 300 intervenes between the first intermediate member 210 and the tip-end member 161 to insulate the first intermediate member 210 from the tip-end member 161. Note that, as illustrated in FIG. 3, a washer may be disposed between the head 231a and the third insulating member 500. The washer reduces interference of the head 231a with the third insulating member 500 upon the thrust-in.

At least one second mounting hole 221 and at least one fourth mounting hole 222 are formed in the second intermediate member 220. In this embodiment, the number of second mounting holes 221 and the number of fourth mounting holes 222 are two or more. In detail, the number of second mounting holes 221 is the same as the number of tip-end mounting holes 161d, which is six. The number of fourth mounting holes 222 is the same as the number of third mounting holes 212, Which is eight. Each second mounting hole 221 is a hole for fixing the end effector 2 to the second intermediate member 220 by using the bolt 22, Each fourth mounting hole 222 is a hole for fixing the second intermediate member 220 to the first intermediate member 210 by using the bolt 232. The bolt 22 is one example of a second bolt.

Each second mounting hole 221 is formed in a principal surface 220a of two principal surfaces 220a and 220b of the second intermediate member 220. Although each second mounting hole 221 extends toward the principal surface 220b from the principal surface 220a, it does not reach the principal surface 220b. Each second mounting hole 221 is an internally threaded hole which is threadedly engageable with the bolt 22 and does not penetrate the second intermediate member 220. Note that the second mounting hole 221 may penetrate the second intermediate member 220. The configuration of each second mounting hole 221 is the same as the tip-end mounting hole 161d. The six second mounting holes 221 are disposed so that the positions of the six second mounting holes 221 match with the positions of the six first mounting holes 211, the six tip-end mounting holes 161d, and the six tool mounting holes 21c.

In detail, in a state where the second intermediate member 220 is attached to the first intermediate member 210 by using the fourth mounting holes 222 and the bolts 232 (i.e., a state where the second intermediate member 220 is fixed to the first intermediate member 210 and the tip-end member 161), the positions of the six second mounting holes 221 are aligned with the positions of the six first mounting holes 211 and the six tip-end mounting holes 161d. In more detail, the phase centering on the rotation axis A6 of the six second mounting holes 221 becomes in agreement with (i.e., the same as) the phase centering on the rotation axis A6 of the six first mounting holes 211 and the six tip-end mounting holes 161d. This phase is a phase in the rotational direction centering on the rotation axis A6. Further, a distance from the rotation axis A6 of the six second mounting holes 221 is the same as a distance from the rotation axis A6 of the six first mounting holes 211 and the six tip-end mounting holes 161d.

That is, in a state where the second intermediate member 220 is fixed to the first intermediate member 210 and the tip-end member 161, the first mounting hole 211 and the second mounting hole 221 are disposed so that the phase of the tip-end mounting holes 161d centering on the rotation axis A6 becomes in agreement with the phase of the second mounting holes 221 centering on the rotation axis A6. Below; "the phase in the rotational direction centering on the rotation axis A6" and "the phase centering on the rotation axis A6" may also simply be referred to as "the phase."

Each fourth mounting hole 222 penetrates the second intermediate member 220 between the principal surfaces 220a and 220b of the second intermediate member 220. The eight fourth mounting holes 222 are disposed so that the positions of the eight fourth mounting holes 222 match with the positions of the eight third mounting holes 212.

The second intermediate member 220 is disposed at the first intermediate member 210 in a state where the principal surface 220b is adjacent to the principal surface 210a of the first intermediate member 210, and the fourth mounting holes 222 are aligned with the third mounting holes 212 in the direction of the rotation axis A6. Further, the bolt 232 is inserted into the fourth mounting hole 222 and the third mounting hole 212 in this order, and is thrusted into the third mounting hole 212. Therefore, the second intermediate member 220 is fixed to the first intermediate member 210. Since the second intermediate member 220 becomes only conductive with the first intermediate member 210, it is electrically insulated from the tip-end member 161.

As described above, the insulating unit 100 is attached to the tip-end member 161 by fixing the first intermediate member 210, the second intermediate member 220, and the first insulating member 300 to the tip-end member 161.

The end effector 2 is attached to the insulating unit 100 attached to the tip-end member 161. In detail, the end effector 2 is disposed at the tip-end member 161 in a state where the principal surface 21b of the fitting part 21 is adjacent to the principal surface 220a of the second intermediate member 220, and the tool mounting holes 21c are aligned with the second mounting holes 221 in the direction of the rotation axis A6. Further, the bolt 22 is inserted into the tool mounting hole 21c and the second mounting hole 221 in this order, and is thrusted into the second mounting hole 221. Therefore, the fitting part 21 is fixed to the second intermediate member 220. Since the fitting part 21 is only conductive with the second intermediate member 220 and the first intermediate member 210, it is electrically insulated from the tip-end member 161. Therefore, the end effector 2 is attached to the tip-end member 161 in a state where it is electrically insulated from the tip-end member 161, via the insulating unit 100.

The configuration and the layout of the second mounting holes 221 are similar to the configuration and the layout of the tip-end mounting holes 161d of the tip-end member 161. Thus, various kinds of end effectors 2 may be attached to the second intermediate member 220, similar to the case where they are attached to the tip-end member 161.

Further, a change in the mechanical interface coordinate system is suppressed between a first case which is a case where the end effector 2 is attached to the second intermediate member 220, and a second case which is a case where the end effector 2 is directly attached to the tip-end member 161.

The mechanical interface coordinate system is a coordinate system for defining the position and the orientation of the end effector 2 attached to the link 16. In the mechanical interface coordinate system, a mechanical interface surface which is a surface to which the fitting part 21 of the end effector 2 is attached is a reference, and, for example, the origin of the mechanical interface coordinate system is an intersection of the mechanical interface surface and the rotation axis A6, In this case. Zm-axis of the mechanical interface coordinate system is the rotation axis A6, Xm-axis and Ym-axis are axes on the mechanical interface surface, where the Xm-axis, the Ym-axis, and the Zm-axis are perpendicular to each other.

In the first case, the mechanical interface surface is the principal surface 220a of the second intermediate member 220, and in the second case, the mechanical interface surface is the flange surface 161a. Since the phase of the six second mounting holes 221 is the same as the phase of the six tip-end mounting holes 161d, the Xm-axis, the Ym-axis, and the Zm-axis of the mechanical interface coordinate system are the same, and the position of the origin of the mechanical interface coordinate system differs in the Zm-axis, between the first case and the second case. Therefore, the change in the mechanical interface coordinate system is reduced between the first case and the second case.

Even when the robotic arm 1 is controlled by any of an automatic control, a manual control, and a combination of these controls, the mechanical interface coordinate system is used for the control of the arm body 10 for making the end effector 2 into a desired position and a desired orientation. Between the first case and the second case, the change in the mechanical interface coordinate system set to a control program of the robotic arm 1 is a minor change, such as only a correction of the home position in the Zm-axis direction, or is not necessary. For example, when the insulating unit 100 is attached to the existing robotic arm 1, required works for the hardware and software are simple and minor.

In the insulating unit 100 according to Embodiment 1 described above, in the state where the first insulating member 300 is disposed between the tip-end member 161 and the first intermediate member 210, the first intermediate member 210 is bolted to the tip-end member 161 and further, the second intermediate member 220 is bolted to the first intermediate member 210. Moreover, for the bolting to the tip-end member 161, the tip-end mounting holes 161d which are formed in the tip-end member 161 by the time the robotic arm 1 is shipped are used, and therefore, formation of new holes in the tip-end member 161 is not necessary. Further, the change in the structure of the arm body 10, such as attachment and detachment of the tip-end member 161, is not necessary. Moreover, the positions of the second mounting holes 221 after the intermediate members 210 and 220 are attached to the tip-end member 161 match with the positions of the tip-end mounting holes 161d. Therefore, this simple work allows the attachment of the insulating unit 100, while maintaining the accuracy of the second mounting holes 221 for attaching the end effector 2. Further, since the first mounting holes 211 and the second mounting holes 221 are disposed at the different members, the bolts 231 for fixing the first intermediate member 210 and the bolts 22 for fixing the end effector 2 are disposed at the same phase, but they do not interfere with each other.

Moreover, in the insulating unit 100 according to Embodiment 1, as illustrated in FIG. 3, the first insulating member 300 does not project in a direction DB more than the tip-end member 161 and the first intermediate member 210 which are adjacent thereto on both sides in a direction DA of the rotation axis A6 (in detail, which contact the first insulating member 300 from both sides). Note that the direction DA is a direction in which the tip-end member 161 and the first intermediate member 210 sandwich the first insulating member 300, and is one example of a first direction. The direction DB is a direction which intersects with the direction DA, and in this embodiment, it is a direction perpendicular to the direction DA, and is one example of a second direction.

Figure 4:
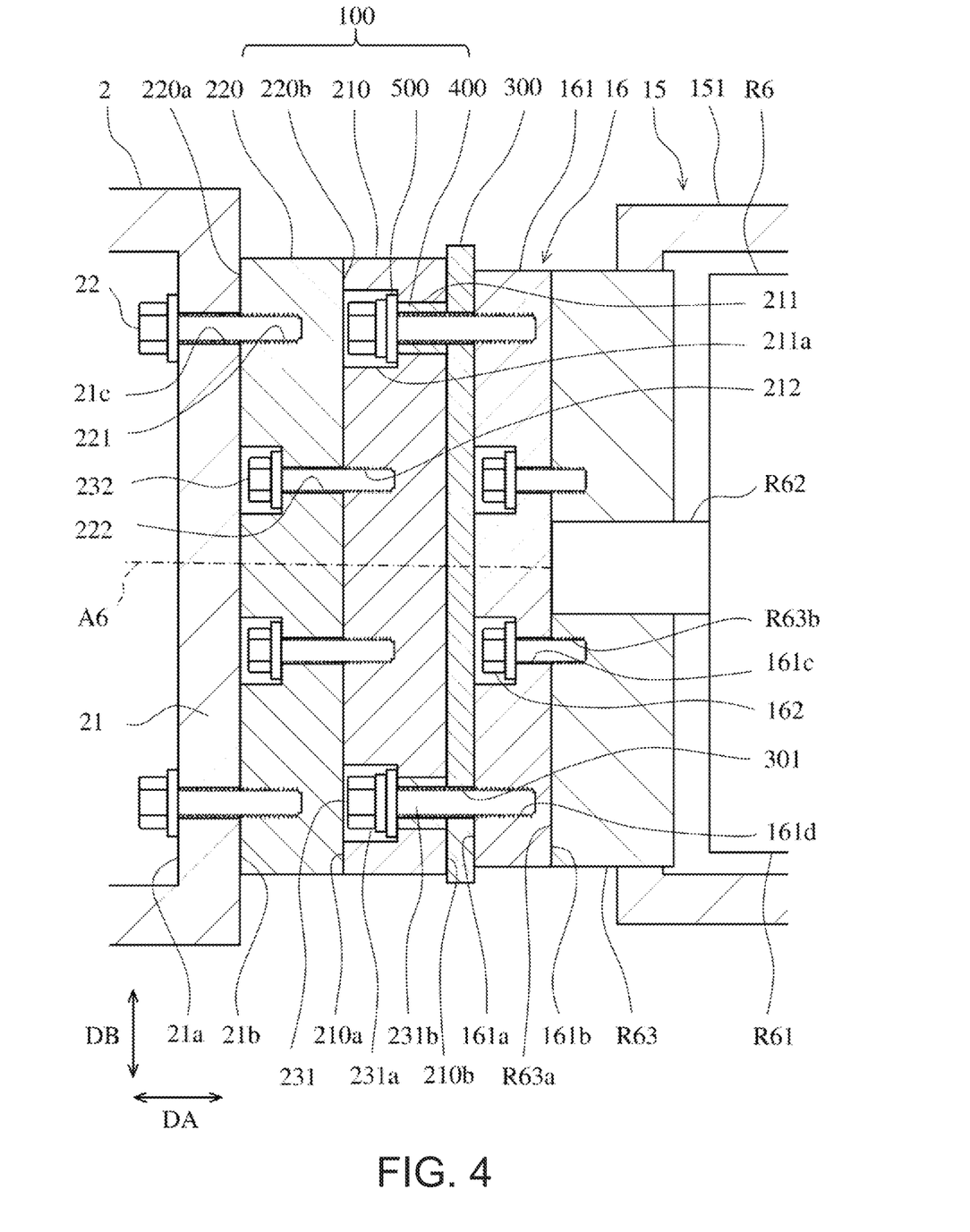
FIG. 4 is a cross-sectional side view illustrating one example of a configuration of Modification 1 of the insulating unit according to Embodiment 1.

However, the configuration of the first insulating member 300 is not limited to the configuration described above. For example, the first insulating member 300 may project, in the direction DB, more than at least one of the tip-end member 161 and the first intermediate member 210, and, as illustrated in FIG. 4, it may project more than both the tip-end member 161 and the first intermediate member 210. Note that FIG. 4 is a cross-sectional side view illustrating one example of a configuration of Modification 1 of the insulating unit 100 according to Embodiment 1.

In detail, in the direction DA, the first insulating member 300 projects in the direction DB more than a part of the tip-end member 161 adjacent to the first insulating member 300 in the direction DA, and a part of the first intermediate member 210 adjacent to the first insulating member 300 in the direction DA. Further, at least a part of the entire circumferential edge of the first insulating member 300 may project in the direction DB as described above, or, as illustrated in FIG. 4, the entire circumferential edge of the first insulating member 300 may project in the direction DB as described above. Therefore, it is suppressed that conductive foreign substances accumulate on the circumferential edge of the first insulating member 300 in the direction DB to make the tip-end member 161 conductive with the first intermediate member 210.

Further, when the first insulating member 300 projects in the direction DB more than the tip-end member 161 or the first intermediate member 210, the first insulating member 300 may project in the direction DB more than the smaller one in the size in the direction DB among the tip-end member 161 and the first intermediate member 210, and the first insulating member 300 may not project in the direction DB more than the larger one in the size in the direction DB among the tip-end member 161 and the first intermediate member 210, for example. That is, the three members described above may be configured so that they form a step shape. This also suppresses that the conductive foreign substances accumulate on the circumferential edge of the first insulating member 300.

Figure 5:
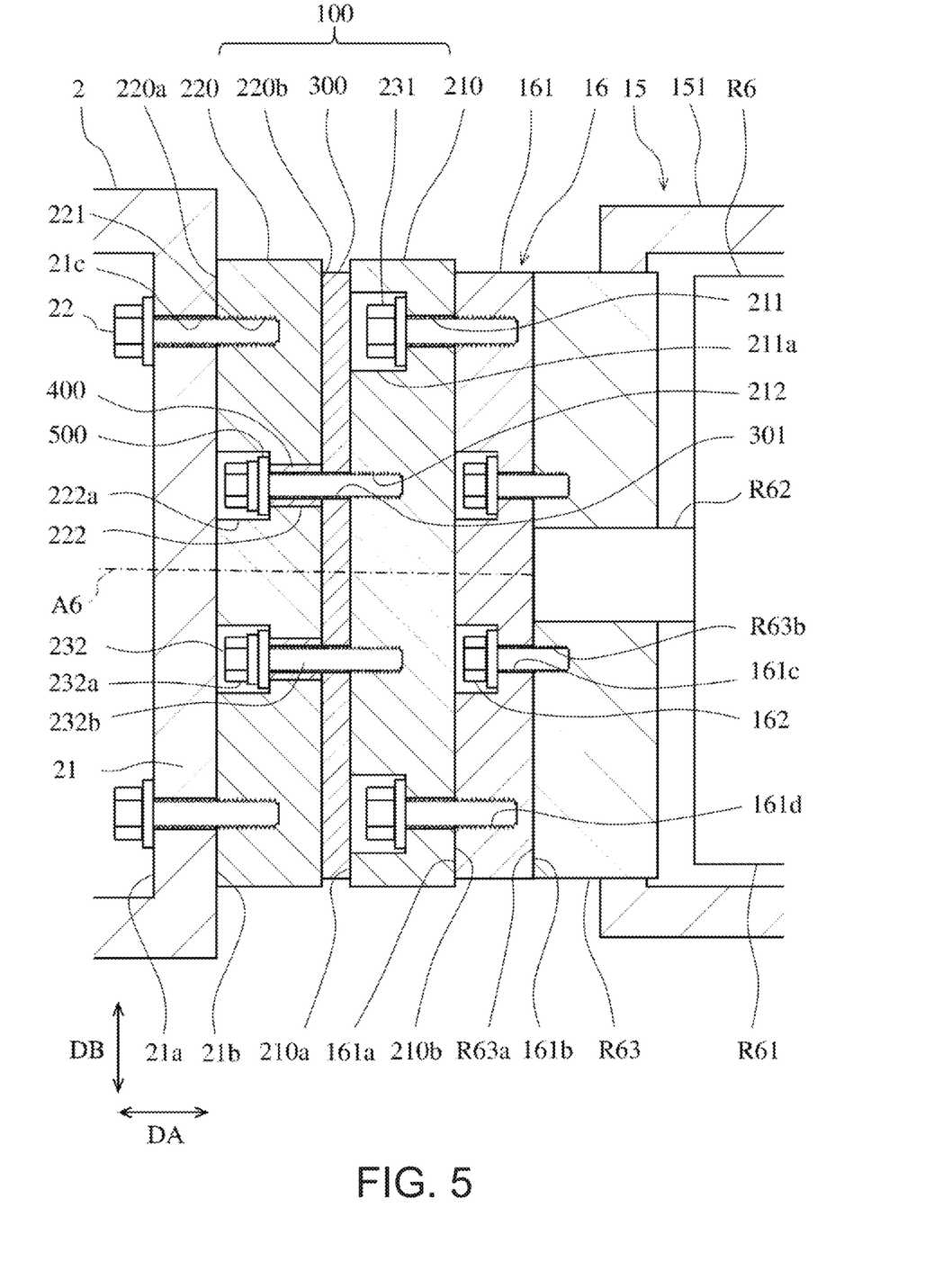
FIG. 5 is a cross-sectional side view illustrating one example of a configuration of Modification 2 of the insulating unit according to Embodiment 1.

Further, although in the insulating unit 100 according to Embodiment 1, as illustrated in FIG. 3, the first insulating member 300 is disposed between the first intermediate member 210 and the tip-end member 161, it is not limited to this configuration. For example, as illustrated in FIG. 5, the first insulating member 300 may be disposed between the first intermediate member 210 and the second intermediate member 220. FIG. 5 is a cross-sectional side view illustrating one example of a configuration of Modification 2 of the insulating unit 100 according to Embodiment 1.

In this case, the second insulating member 400 is disposed inside each fourth mounting hole 222 of the second intermediate member 220, and, in detail, it is disposed at a part of each fourth mounting hole 222 other than a counter sinking part 222a. The third insulating member 500 is disposed inside the counter sinking part 222a of each fourth mounting hole 222, and, in detail, it is disposed between the head 232a of the bolt 232 inserted into each fourth mounting hole 222 and the inner surface of the counter sinking part 222a.

The insertion hole 301 of the first insulating member 300 is disposed not at the positions of the tip-end mounting holes 161d, but at the position which matches with the position of the fourth mounting hole 222. The number of insertion holes 301 is the same as the number of fourth mounting holes 222, which is eight.

The first insulating member 300 insulates the first intermediate member 210 from the second intermediate member 220. The second insulating member 400 insulates a shank 232b of the bolt 232 from the second intermediate member 220. The third insulating member 500 insulates the head 232a of the bolt 232 from the second intermediate member 220. Therefore, the insulating unit 100 can insulate the end effector 2 from the tip-end member 161. In this modification, the first insulating member 300 is disposed between the second intermediate member 220 and the tip-end member 161, and insulates the second intermediate member 220 from the tip-end member 161. In FIG. 5, the first insulating member 300 does not project in the direction DB more than the first intermediate member 210 and the second intermediate member 220, but it is not limited to this configuration. The first insulating member 300 may project in the direction DB more than at least one of the first intermediate member 210 and the second intermediate member 220.

Further, although in Embodiment 1 and Modifications 1-2, in the first intermediate member 210, the plurality of third mounting holes 212 are disposed at the positions radially inward of the rotation axis A6 with respect to the plurality of first mounting holes 211, and in the second intermediate member 220, the plurality of fourth mounting holes 222 are disposed at the positions radially inward attic rotation axis A6 with respect to the plurality of second mounting holes 221, they are not limited to this configuration. The third mounting hole 212 and the fourth mounting hole 222 may be disposed at any positions different from the first mounting hole 211 and the second mounting hole 221, respectively. For example, the third mounting holes 212 and the fourth mounting holes 222 may be disposed so that their phases are shifted to the equivalent positions in the radial direction of the rotation axis A6, respectively, or may be disposed at radially-outward positions, with respect to the first mounting hole 211 and the second mounting hole 221.

Embodiment 2

An insulating unit 100A according to Embodiment 2 is described. The insulating unit 100A according to Embodiment 2 differs from Embodiment 1 in that an intermediate member 200A is constituted by a single member. Below, for this embodiment, the differences from Embodiment 1 and Modifications 1-2 will mainly be described, and explanation of the similarities to Embodiment 1 and Modifications 1-2 will be omitted suitably.

Figure 6:
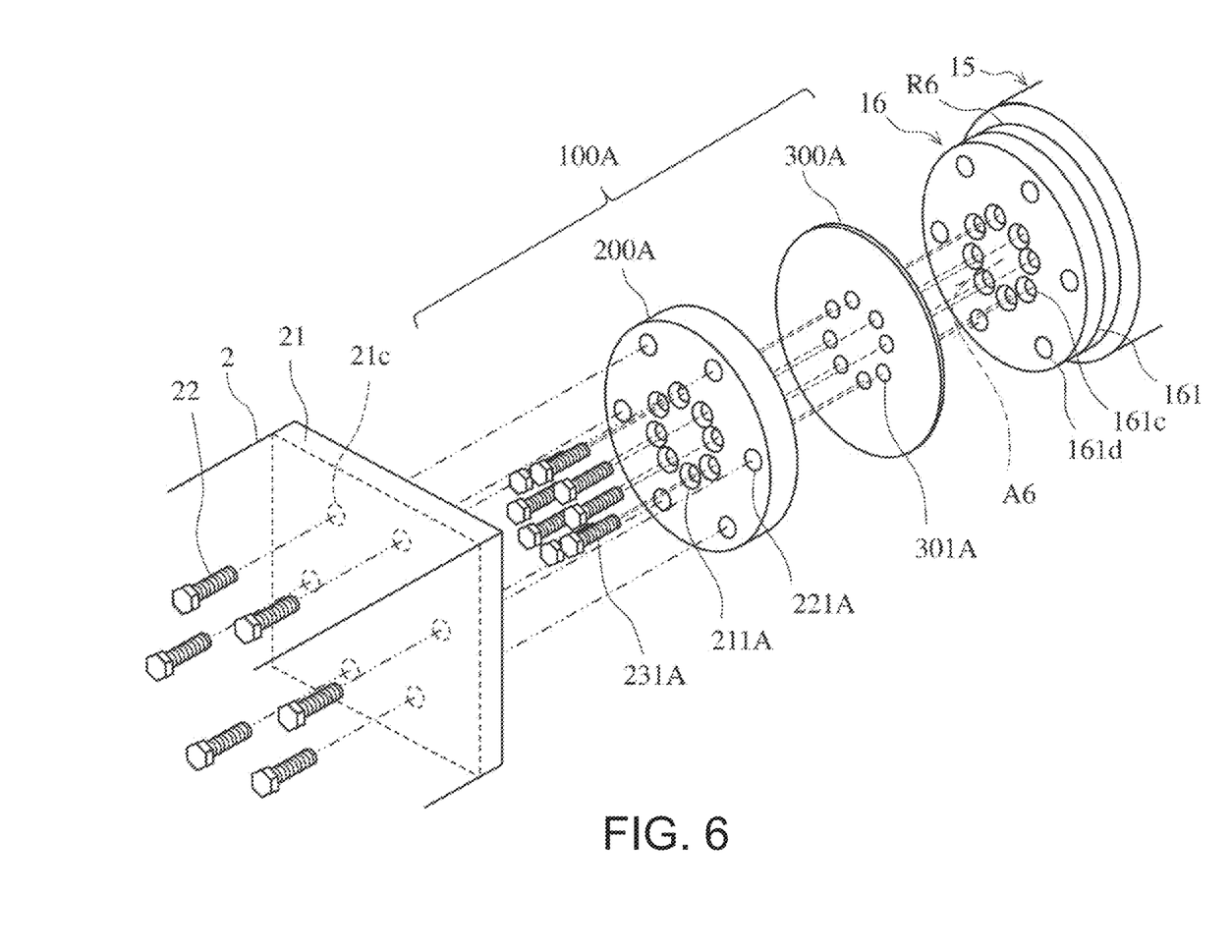
FIG. 6 is an exploded perspective view illustrating one example of a configuration of an insulating unit according to Embodiment 2.
Figure 7:
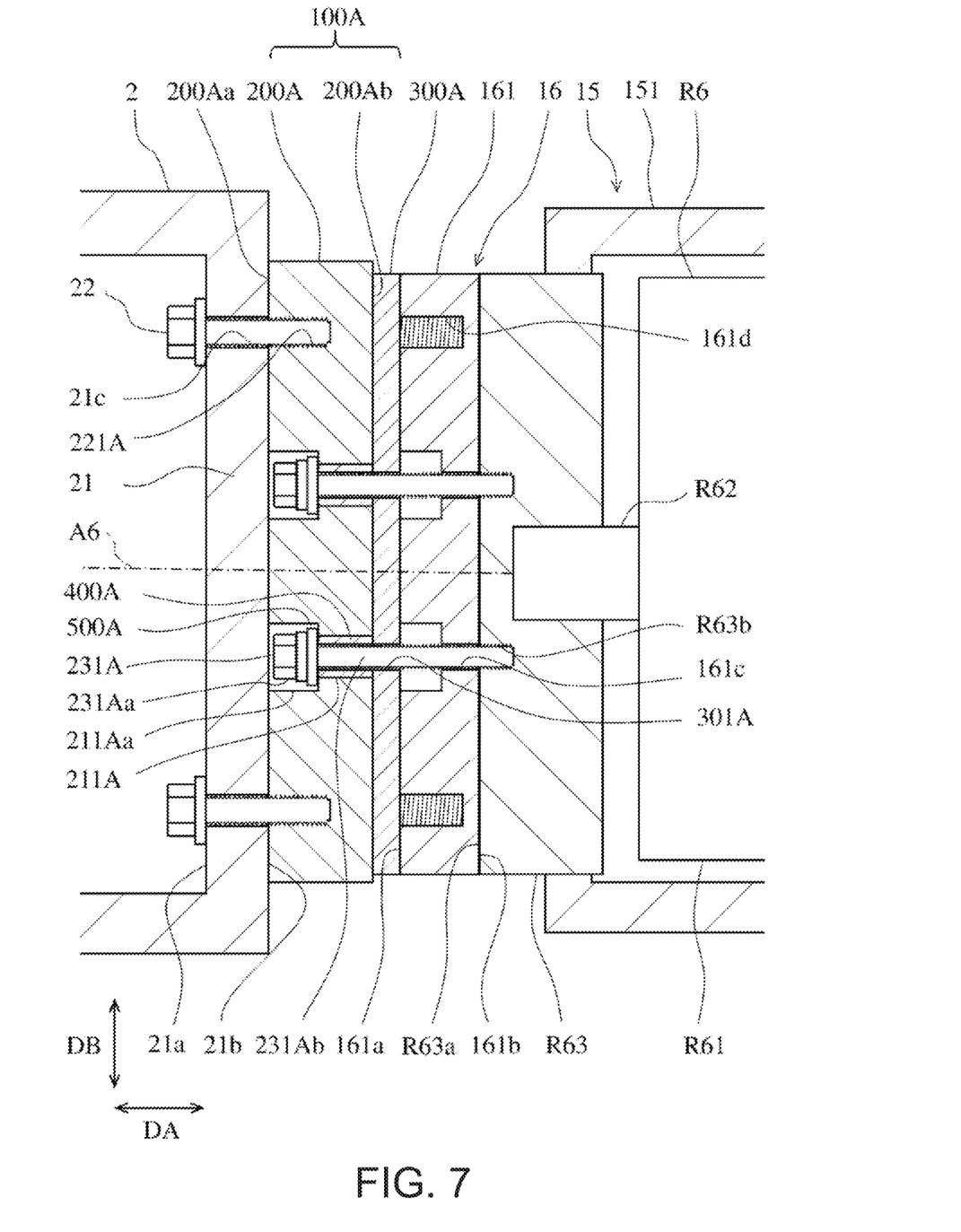
FIG. 7 is a cross-sectional side view illustrating one example of the configuration of the insulating unit according to Embodiment 2.

FIG. 6 is an exploded perspective view illustrating one example of a configuration of the insulating unit 1100A according to Embodiment 2. FIG. 7 is a cross-sectional side view illustrating one example of the configuration of the insulating unit 100A according to Embodiment 2. As illustrated in FIGS. 6 and 7, the insulating unit 100A includes the intermediate member 200A and a first insulating member 300A.

The intermediate member 200A is a single plate-like member, and in this embodiment, it is a disk. At least one first mounting hole 211A and at least one second mounting hole 221A are formed in the intermediate member 200A. In this embodiment, the number of first mounting holes 211A is two or more, and, in detail, it is the same as the number of member fixing holes 161c of the tip-end member 161, which is eight. The number of second mounting holes 221A is two or more, and, in detail, it is the same as the number of tip-end mounting holes 161d of the tip-end member 161, which is six.

Each first mounting hole 211A penetrates the intermediate member 200A between two principal surfaces 200Aa and 200Ab of the intermediate member 200A. The configuration of each first mounting hole 211A is similar to the configuration of the fourth mounting hole 222 of the second intermediate member 220 according to Embodiment 1. The eight first mounting holes 211A are disposed so that the positions of the eight first mounting holes 211A match with the positions of the eight member fixing holes 161c.

Each second mounting hole 221A is formed in the principal surface 200Aa of the intermediate member 200A. Although each second mounting hole 221A extends toward the principal surface 200Ab from the principal surface 200Aa, it does not reach the principal surface 200Ab. Each second mounting hole 221A is an internally threaded hole which is threadedly engageable with the bolt 22 and does not penetrate the intermediate member 200A. The configuration of each second mounting hole 221A is similar to the configuration of the second mounting hole 221 of the second intermediate member 220 according to Embodiment 1.

The six second mounting holes 221A are disposed so that the positions of the six second mounting holes 221A match with the positions of the six tip-end mounting holes 161d. In detail, in a state where the intermediate member 200A is fixed to the tip-end member 161 by using the first mounting holes 211A and bolts 231A, the positions of the six second mounting holes 221A are aligned with the positions of the six tip-end mounting holes 161d. In more detail, the phase of the six second mounting holes 221A and the distance of the six second mounting holes 221A from the rotation axis A6 are the same as the phase of the six tip-end mounting holes 161d and the distance of the six tip-end mounting holes 161d from the rotation axis A6. That is, in the state where the intermediate member 200A is fixed to the tip-end member 161, the first mounting hole 211A and the second mounting hole 221A are disposed so that the phase of the second mounting holes 221A centering on the rotation axis A6 matches with the phase of the tip-end mounting holes 161d centering on the rotation axis A6.

The first insulating member 300A has a similar configuration to the first insulating member 300 according to Embodiment 1 except for the number of insertion holes 301A and the layout of the insertion holes 301A. The number of insertion holes 301A is the same as the number of member fixing holes 161c, which is eight. The eight insertion holes 301A are disposed so that the positions of the eight insertion holes 301A match with the positions of the eight member fixing holes 161c.

The insulating unit 100A has second insulating member 400A having a similar configuration to the second insulating member 400 according to Embodiment 1, inside each first mounting hole 211A. The second insulating member 400A is disposed at a part of the first mounting hole 211A other than a counter sinking part 211Aa. Further, the insulating unit 100A has a third insulating member 500A having a similar configuration to the third insulating member 500 according to Embodiment 1, inside the counter sinking part 211Aa of each first mounting hole 211A.

The intermediate member 200A is disposed at the tip-end member 161 in a state where the principal surface 200Ab is adjacent to the principal surface 161a of the tip-end member 161, and the first mounting holes 211A are aligned with the member fixing holes 161c in the direction of the rotation axis A6. At this time, the first insulating member 300A is disposed between the intermediate member 200A and the tip-end member 161 in a state where the insertion holes 301A are aligned with the member fixing holes 161c in the direction of the rotation axis A6. Note that the bolt 162 which fixes the tip-end member 161 to the end flange R63 is removed beforehand from the member fixing hole 161c. The third insulating member 500A is disposed inside the counter sinking part 211Aa, and the third insulating member 500A, the second insulating member 400A, the insertion hole 301A, the member fixing hole 161c, and the flange fixing hole R63b are lined up in a single file. A shank 231Ab of a bolt 231A is inserted into the third insulating member 500A, the second insulating member 400A, the insertion hole 301A, the member fixing hole 161c, and the flange fixing hole R63b in this order, and is thrusted into the flange fixing hole R63b. The flange fixing hole R63b is used for fixing the intermediate member 200A to the tip-end member 161.

Therefore, the intermediate member 200A is fixed to the tip-end member 161 in a state where the first insulating member 300A is sandwiched between the intermediate member 200A and the tip-end member 161. The third insulating member 500A insulates a head 231Aa of the bolt 231A from the intermediate member 200A. The second insulating member 400A insulates the shank 231Ab of the bolt 231A from the intermediate member 200A. The first insulating member 300A insulates the intermediate member 200A from the tip-end member 161. Note that, as illustrated in FIG. 7, a washer may be disposed between the head 231Aa and the third insulating member 500A.

The end effector 2 is attached to the insulating unit 100A attached to the tip-end member 161. In detail, the end effector 2 is disposed at the intermediate member 200A in a state where the principal surface 21b of the fitting part 21 is adjacent to the principal surface 200Aa. of the intermediate member 200A, the tool mounting holes 21c are aligned with the second mounting holes 221A in the direction of the rotation axis A6. Further, the bolt 22 is inserted into the tool mounting hole 21c and the second mounting hole 221A in this order, and is thrusted into the second mounting hole 221A. Therefore, the fitting part 21 is fixed to the intermediate member 200A. The fitting part 21 becomes only conductive with the intermediate member 200A. Therefore, the end effector 2 is attached to the tip-end member 161 via the insulating unit 100A in a state where it is electrically insulated from the tip-end member 161.

The configuration and the layout of the second mounting holes 221A are similar to the configuration and the layout of the tip-end mounting holes 161d. Thus, various kinds of end effectors 2 may be attached to the intermediate member 200A similar to the case where they are attached to the tip-end member 161.

Further, the change in the mechanical interface coordinate system is reduced between the first case which is the case where the end effector 2 is attached to the intermediate member 200A, and the second case which is the case where the end effector 2 is directly attached to the tip-end member 161.

According to the insulating unit 100A according to Embodiment 2 as described above, similar effects to the insulating unit 100 according to Embodiment 1 are acquired. Further, since the intermediate member 200A is comprised of a single member, a reduction of the number of components is possible. Moreover, the member fixing holes 161c which are formed in the tip-end member 161 by the time the robotic arm 1 is shipped are used for bolting the intermediate member 200A to the tip-end member 161, and therefore, the formation of new holes in the tip-end member 161 is not necessary. Further, the positions of the second mounting holes 221A after the intermediate member is attached 200A to the tip-end member 161 become in agreement with the positions of the tip-end mounting holes 161d. Further, since the first mounting hole 211A and the second mounting hole 221A correspond to the member fixing hole 161c and the tip-end mounting hole 161d which are different holes, respectively, interference between the bolt 231A and the bolt 22 is suppressed.

Further, in this embodiment, although the first insulating member 300A is configured so that it does not project in the direction DB more than the intermediate member 200A and the tip-end member 161 which are adjacent thereto (in detail, which contact thereto) on both sides in the direction DA, it is not limited to this configuration. The first insulating member 300A may project in the direction DB more than at least one of the intermediate member 200A and the tip-end member 161, or may project at at least a part of the circumferential edge of the first insulating member 300A.

Other Embodiments

Although examples of the embodiments of the present disclosure are described above, the present disclosure is not limited to the embodiments and the modifications. That is, various modifications and improvements are possible within the scope of the present disclosure. For example, the scope of the present disclosure also includes the resultant of applying various modifications to the embodiments and the modifications, and a mode established by combining the components in the different embodiments and modifications.

For example, in the insulating unit according to the embodiments and the modifications, a positioning member for positioning the intermediate member, the insulating member, and the fitting part 21 of the end effector 2 with respect to the tip-end member 161 may be disposed. For example, the positioning member may be a bar-shaped member, such as a pin, which is penetrated into the tip-end member 161, the intermediate member, the insulating member, and the fitting part 21.

For example, in the insulating unit 100, at least two pins may be inserted into insertion holes formed in the tip-end member 161, and the insulating member 300, the first intermediate member 210, the second intermediate member 220, and the fitting part 21 may be disposed so that the pins are inserted into through-holes formed therein, respectively. Further, in the insulating unit 100A, at least two pins may be inserted into insertion holes of the tip-end member 161, and the insulating member 300A, the intermediate member 200A, and the fitting part 21 may be disposed so that the pins are inserted into respective through-holes. Therefore, the intermediate member, the insulating member, and the fitting part 21 are positioned with respect to the tip-end member 161 in the rotational direction centering on the rotation axis A6. Further, the high-accuracy positioning becomes possible by configuring so that the insertion hole and the through-hole, and the pin closely fit to each other. The pin may be made of material having electrical insulation, and when the pin has conductivity, a member having electrical insulation may be disposed between the insertion hole and the through-hole, and the pin.

Note that a single pin may be configured so that it does not pass through all of the tip-end member 161, the intermediate member, the insulating member, and the fitting part 21, but it passes through a part of the members. For example, the single pin may be configured so that it only passes through the members among the tip-end member 161, the intermediate member, and the fitting part 21 which are adjacent to each other in the direction of the rotation axis A6, and the pin may be disposed at each of the adjacent members.

Further, although in the embodiments and the modifications the robotic arm 1 is the vertical articulated robotic arm, it is not limited to this configuration, and it may be any kind of robotic arm to which the end effector 2 is attachable. For example, the robotic arm 1 may be a robotic arm of a horizontal articulated type, a polar coordinate type, a cylindrical coordinate type, a Cartesian coordinate type, or other types.

Further, although in the embodiments and the modifications the bolt which fixes each member is metal and has conductivity, it is not limited to this configuration, and a non-conductive bolt may be used. In this case, the second insulating: members 400 and 400A and the third insulating: members 500 and 500A may be omitted.

Moreover, examples of the respective aspects of the art of the present disclosure are given as follows. The insulating unit according to one aspect of the present disclosure is an insulating unit disposed so as to intervene between the tip-end member of the robotic arm and the end effector attached to the tip-end member. The insulating unit includes the intermediate member which is fixed to the tip-end member, the end effector is attachable to the intermediate member, and the insulating member which is disposed between the intermediate member and the tip-end member, and insulates the intermediate member from the tip-end member. The intermediate member includes the at least one first mounting hole into which the first bolt for fixing the intermediate member to the tip-end member is inserted, and the at least one second mounting hole into which the second bolt for fixing the end effector to the intermediate member is inserted. The first mounting hole and the second mounting hole are disposed so that, in a state where the intermediate member is fixed to the tip-end member, the positions of the second mounting holes match with the positions of the tip-end mounting holes for attachment of the end effector respectively, and the tip-end mounting holes are formed beforehand in the tip-end member.

According to this aspect, the insulating member is attached to the tip-end member by attaching the intermediate member to the tip-end member by using the first bolt in the state where the insulating member is disposed between the tip-end member of the robotic arm and the intermediate member. At this time, since a change in the structure of the robotic arm, such as the attachment and detachment of the tip-end member, is not necessary, and the intermediate member is fixed by being bolted, the attachment work is simple. Further, the positions of the second mounting holes after the intermediate member is attached match with the positions of the tip-end mounting holes of the tip-end member. Therefore, an error between the position and the orientation of the end effector when being attached to the second mounting hole, and the position and the orientation of the end effector when being attached to the tip-end mounting hole is reduced. Therefore, it is possible to attach the insulating member to the robotic arm by the simple work, while maintaining the attaching accuracy of the end effector.

In the insulating unit according to the aspect of the present disclosure, the tip-end member may be rotatable about a rotation axis of the robotic arm, and the first mounting hole and the second mounting hole may be disposed so that, in the state where the intermediate member is fixed to the tip-end member, a phase of the second mounting holes centering on the rotation axis matches with a phase of the tip-end mounting holes centering on the rotation axis.

According to this aspect, an error between the phase of the end effector when being attached to the second mounting hole of the intermediate member and the phase of the end effector when being attached to the tip-end mounting hole is reduced. Therefore, the attaching accuracy of the end effector in the rotation direction centering on the rotation axis is maintained.

In the insulating unit according to the aspect of the present disclosure, the second mounting hole may be a threaded hole that is threadedly engageable with the second bolt and does not penetrate the intermediate member.

According to aspect, it is suppressed that the second bolt penetrates the intermediate member to contact and conduct with the tip-end member. Therefore, secure insulation becomes possible.

In the insulating unit according to the aspect of the present disclosure, the intermediate member may include the first intermediate member including a third mounting hole and the first mounting hole that is disposed so as to match with the position of the tip-end mounting hole, the first intermediate member being fixed to the tip-end member, and the second intermediate member including the second mounting hole disposed so as to match with the position of the first mounting hole, and the fourth mounting hole disposed so as to match with the position of the third mounting hole, the second intermediate member being fixed to the first intermediate member. The first bolt may be inserted into the first mounting hole and the tip-end mounting hole in order to fix the first intermediate member to the tip-end member. The third bolt may be inserted into the third mounting hole and the fourth mounting hole in order to fix the second intermediate member to the first intermediate member.

According to this aspect, the first intermediate member is fixed to the tip-end member by the first bolt inserted into the first mounting hole and the tip-end mounting hole. The second intermediate member is fixed to the first intermediate member by the third bolt inserted into the fourth mounting hole and the third mounting hole. The end effector is fixed to the second intermediate member by the second bolt inserted into the second mounting hole. Therefore, simplified attachment of the first and second intermediate members is possible by utilizing the tip-end mounting hole of the tip-end member. Further, since the first mounting hole and the second mounting hole are disposed at the different members, the interference between the first bolt for fixing the first intermediate member and the second bolt for fixing the end effector is suppressed.

In the insulating unit according to the aspect of the present disclosure, the insulating member may be disposed between the first intermediate member and the tip-end member.

According to this aspect, the insulating member can insulate the end effector from the robotic arm by insulating the first intermediate member from the tip-end member.

In the insulating unit according to the aspect of the present disclosure, the insulating member may be disposed between the first intermediate member and the second intermediate member.

According to this aspect, the insulating member is disposed between the first intermediate member and the second intermediate member, that is, they are disposed between the second intermediate member and the tip-end member. The insulating member can insulate the first intermediate member from the second intermediate member, and thus can insulate the second intermediate member from the tip-end member, thereby insulating the end effector from the robotic arm.

In the insulating unit according to the aspect of the present disclosure, the tip-end mounting hole may be a threaded hole threadedly engageable with the first bolt, the first mounting hole may be a hole penetrating the first intermediate member, the second mounting hole may be a threaded hole that is threadedly engageable with the second bolt and does not penetrate the second intermediate member, the third mounting hole may be a threaded hole that is threadedly engageable with the third bolt and does not penetrate the first intermediate member, and the fourth mounting hole may be a hole penetrating the second intermediate member.

According to this aspect, the first intermediate member is fixed to the tip-end member by being threadedly engaged with the tip-end mounting hole, the second intermediate member is fixed to the first intermediate member by being threadedly engaged with the third mounting hole, and the end effector is fixed to the second intermediate member by being threadedly engaged with the second mounting hole, Therefore, the fixing work of each member and the end effector is simple. Further, it is suppressed that each bolt penetrates the second mounting hole or the third mounting hole to contact the first intermediate member or the tip-end member.

In the insulating unit according to the aspect of the present disclosure, the tip-end member may include the tip-end mounting hole, and at least one member fixing hole into which a bolt that fixes the tip-end member to the robotic arm is inserted. The first mounting holes may be disposed so as to match with the positions of the member fixing holes, respectively. The first bolt may be inserted into the first mounting hole and the member fixing hole in order to fix the intermediate member to the tip-end member.

According to this aspect, the intermediate member is fixed to the tip-end member by the first bolt inserted into the first mounting hole and the member fixing hole. The intermediate member is fixed to the tip-end member using the member fixing hole different from the tip-end mounting hole. Therefore, interference between the first bolt and the second bolt is suppressed.

In the insulating unit according to the aspect of the present disclosure, the first mounting hole may be a hole penetrating the intermediate member.

According to this aspect, the intermediate member is fixed to the tip-end member by the first bolt being inserted. Therefore, the fixing work of the intermediate member is simple.

In the insulating unit according to the aspect of the present disclosure, the insulating member may project in the second direction more than at least either one of the tip-end member or the intermediate member that are adjacent to the insulating member on both sides of the insulating member in the first direction that is a direction in which the insulating member is sandwiched by the tip-end member and the intermediate member. The second direction may be a direction that intersects with the first direction.

According to this aspect, the insulating member projects in the second direction more than at least one of the tip-end member and the intermediate member which are adjacent to the insulating member on both sides thereof. Therefore, it is suppressed that conductive objects accumulate on the edge of the insulating member in the second direction to make the members on the both sides be conductive with each other.

In the insulating unit according to the aspect of the present disclosure, the tip-end member may have the surface including the mechanical interface with the end effector, and may be a part of the robotic arm.

According to this aspect, the insulating unit can intervene between the surface which constitutes the mechanical interface and the end effector so that they are insulated from each other.

In the insulating unit according to the aspect of the present disclosure, the tip-end member may be rotatable about the rotation axis of the robotic arm, and the tip-end member may be connected to the drive that gives the rotational driving force to the tip-end member.

According to this aspect, the tip-end member can constitute the operable reinforcement member of the robotic arm. Further, the tip-end member is connected to the drive. The insulating member can insulate the end effector from the drive by insulating such a tip-end member from the end effector.

A robot according to one aspect of the present disclosure includes the insulating unit according to the aspect of the present disclosure at the tip-end member of the robotic arm. According to this aspect, the similar effects to the insulating unit according to one aspect of the present disclosure are acquired.

Note that all the numbers used above, such as the order and the quantity are illustrated in order to concretely explain the technique of the present disclosure, and the present disclosure is not limited to the illustrated numbers. Further, the connection relationships between the components are illustrated in order to concretely explain the technique of the present disclosure, and the connection relationship which realizes the functions of the present disclosure is not limited to those relationships.

Since the scope of the present disclosure is defined by the appended claims rather than the description of this specification so that the present disclosure may be implemented in various ways without departing from the spirit of the essential features, the embodiments are illustrative but are not restrictive. All the modifications of the claims and all the modifications within the scope of the claims, or the equivalents of the claims and the scope of the claims are intended to be encompassed in the appended claims.

What is claimed is:

1. An insulating structure disposed so as to intervene between a first member of a robotic arm and an end effector attached to the first member, comprising:
a second member fixed to the first member, the end effector being attachable to the second member; and
an insulator that is disposed between the second member and the first member, and insulates the second member from the first member,
wherein the second member includes:
a second hole into which a first bolt that fixes the second member to the first member is inserted; and
a third hole into which a second bolt that fixes the end effector to the second member is inserted, and
wherein the second hole and the third hole are disposed so that, in a state where the second member is fixed to the first member, the position of the third hole matches with the position of a first hole and is colinear with the first hole for attachment of the end effector,
wherein the second member includes:
a third member including a fourth hole and the second hole that is disposed so as to match with the position of the first hole and is colinear with the first hole, the third member being fixed to the first member; and
a fourth member including the third hole disposed so as to match with the position of the second hole, and a fifth hole disposed so as to match with the position of the fourth hole, the fourth member being fixed to the third member,
wherein the first bolt is inserted into the second hole and the first hole in order to fix the third member to the first member, and
wherein a third bolt is inserted into the fourth hole and the fifth hole in order to fix the fourth member to the third member,
wherein a length of each of the first hole, the second hole, the third hole, and the fourth hole is in a same direction.

2. The insulating structure of claim 1, wherein the first member is rotatable about a rotation axis of the robotic arm, and
wherein the second hole and the third hole are disposed so that, in the state where the second member is fixed to the first member, a phase of the third hole centering on the rotation axis matches with a phase of the first hole centering on the rotation axis.

3. The insulating structure of claim 1, wherein the third hole is a threaded hole that is threadedly engageable with the second bolt and does not penetrate the second member.

4. The insulating structure of claim 1, wherein the insulator is disposed between the third member and the first member.

5. The insulating structure of claim 1, wherein the insulator is disposed between the third member and the fourth member.

6. The insulating structure of claim 1, wherein the first hole is a threaded hole threadedly engageable with the first bolt,
wherein the second hole is a hole penetrating the third member,
wherein the third hole is a threaded hole that is threadedly engageable with the second bolt and does not penetrate the fourth member,
wherein the fourth hole is a threaded hole that is threadedly engageable with the third bolt and does not penetrate the third member, and
wherein the fifth hole is a hole penetrating the fourth member.

7. The insulating structure of claim 1, wherein the first member includes the first hole, and a sixth hole into which a bolt that fixes the first member to the robotic arm is inserted,
wherein the second hole is disposed so as to match with the position of the sixth hole, and
wherein the first bolt is inserted into the second hole and the sixth hole in order to fix the second member to the first member.

8. The insulating structure of claim 7, wherein the second hole is a hole penetrating the second member.

9. The insulating structure of claim 1, wherein the insulator projects in a second direction more than at least either one of the first member or the second member that are adjacent to the insulator on both sides of the insulator in a first direction that is a direction in which the insulator is sandwiched by the first member and the second member, and
wherein the second direction is a direction that intersects with the first direction.

10. The insulating structure of claim 1, wherein the first member has a surface including a mechanical interface with the end effector, and is a part of the robotic arm.

11. The insulating structure of claim 1, wherein the first member is rotatable about the rotation axis of the robotic arm, and
wherein the first member is connected to a drive that gives a rotational driving force to the first member.

12. A robot comprising the insulating structure of claim 1 at the first member of the robotic arm.

* * * * *